(12) United States Patent
Moille (10) Patent No.: US 10,433,622 B2
(45) Date of Patent: Oct. 8, 2019

(54) DEVICE AND METHOD FOR THE PIVOTING ASSEMBLY OF AT LEAST TWO COMPONENTS AND CORRESPONDING ASSEMBLY MADE OF TWO ASSEMBLED COMPONENTS

(71) Applicant: ROLEX SA, Geneva (CH)

(72) Inventor: Daniel Moille, Yvoire (FR)

(73) Assignee: ROLEX SA, Geneva (CH)

( * ) Notice: Subject to any disclaimer, the term of this patent is extended or adjusted under 35 U.S.C. 154(b) by 268 days.

(21) Appl. No.: 14/636,460

(22) Filed: Mar. 3, 2015

(65) Prior Publication Data

US 2015/0250272 A1    Sep. 10, 2015

(30) Foreign Application Priority Data

Mar. 4, 2014    (EP) .................................... 14157590

(51) Int. Cl.
*A44C 5/10* (2006.01)
*F16B 33/00* (2006.01)
*F16B 39/10* (2006.01)

(52) U.S. Cl.
CPC ............ *A44C 5/107* (2013.01); *F16B 33/002* (2013.01); *F16B 39/10* (2013.01); *Y10T 29/49963* (2015.01); *Y10T 403/32951* (2015.01)

(58) Field of Classification Search
CPC ..... Y10T 403/49963; Y10T 403/32951; Y10T 29/49963; Y10T 29/32951; Y10T 16/557;
(Continued)

(56) References Cited

U.S. PATENT DOCUMENTS

| | | | | |
|---|---|---|---|---|
| 1,758,309 | A | * | 5/1930 | Block ................. E05D 11/1007 16/332 |
| 1,837,204 | A | * | 12/1931 | Chester ............... E05D 11/1007 16/343 |

(Continued)

FOREIGN PATENT DOCUMENTS

| | | |
|---|---|---|
| CH | 695 389 A5 | 4/2006 |
| EP | 2 462 829 A1 | 6/2012 |

(Continued)

OTHER PUBLICATIONS

European Search Report and the Written Opinion dated Jun. 24, 2014, issued in corresponding application No. EP 14 15 7590; with English partial translation and partial machine-translation (11 pages).

(Continued)

*Primary Examiner* — Amber R Anderson
*Assistant Examiner* — Nahid Amiri
(74) *Attorney, Agent, or Firm* — Westerman, Hattori, Daniels & Adrian, LLP (57) ABSTRACT

The assembly device is intended for the pivoting attachment of at least two components (M1, M2). It comprises a screw (4) intended to be screwed into a first component (M1) and bearing a guide pin (5) guiding the pivoting of a second component (M2). According to the invention, the pin (5) comprises at least one rotation-prevention zone (540) having a shape designed to collaborate with a zone of corresponding shape of the first component (M1), so as to prevent said pin from rotating.

18 Claims, 6 Drawing Sheets

(58) Field of Classification Search
CPC .... F16C 11/0619; A44C 5/107; F16B 33/002; F16B 39/10; F16B 19/02; F16B 19/04; F16B 19/12; F16G 15/00; F16G 13/00; F16G 13/18; B21L 11/00; E05D 5/12; E05D 5/121; E05D 2005/122; E05D 2005/124
USPC ................ 403/161, 164, 165; 59/78, 80, 82; 16/340, 342
See application file for complete search history.

(56) References Cited

U.S. PATENT DOCUMENTS

| | | | | |
|---|---|---|---|---|
| 4,679,285 | A * | 7/1987 | Ballantyne | B21D 53/40 16/274 |
| 5,331,610 | A * | 7/1994 | Kikuchi | G04B 37/1486 224/164 |
| 6,026,637 | A * | 2/2000 | Dombre | A44C 5/107 59/80 |
| 6,098,394 | A * | 8/2000 | Hashimoto | A44C 5/10 59/80 |
| 6,178,598 | B1 * | 1/2001 | Creely, III | E05D 7/0423 16/244 |
| 6,485,061 | B1 * | 11/2002 | Mosing | F16L 15/008 285/333 |
| 6,622,469 | B2 * | 9/2003 | Gunster | A44C 5/102 59/80 |
| 7,043,895 | B2 * | 5/2006 | Mace | A44C 5/107 59/80 |
| 7,730,710 | B2 * | 6/2010 | Rejzner | A44C 5/107 59/78 |
| 8,291,550 | B2 * | 10/2012 | Yang | E05D 3/04 16/342 |
| 8,602,638 | B2 | 12/2013 | Catheline | |
| 9,289,036 | B2 * | 3/2016 | Catheline | A44C 5/107 |
| 2002/0040573 | A1 * | 4/2002 | Greguitch | A44C 5/107 59/80 |
| 2002/0145336 | A1 * | 10/2002 | Bottom | B21L 9/08 305/202 |
| 2009/0083943 | A1 * | 4/2009 | Chen | G06F 1/1681 16/342 |
| 2012/0144862 | A1 | 6/2012 | Catheline | |
| 2013/0286796 | A1 * | 10/2013 | Chatelain | G04B 37/1486 368/282 |
| 2015/0249377 | A1 * | 9/2015 | Zeng | H02K 7/06 310/80 |

FOREIGN PATENT DOCUMENTS

| | | | | |
|---|---|---|---|---|
| FR | 2408062 | A1 | 6/1979 | |
| FR | 2 746 267 | A1 | 9/1997 | |
| FR | 695389 | A5 * | 4/2006 | ............. A44C 5/107 |
| JP | S54-127550 | U | 9/1979 | |
| JP | S58-163929 | U | 11/1983 | |
| JP | H02-121719 | U | 10/1990 | |
| JP | H08-129152 | A | 5/1996 | |
| JP | 2002-349539 | A | 12/2002 | |
| JP | 2005-124770 | A | 5/2005 | |

OTHER PUBLICATIONS

Chinese Office Action dated May 28, 2018 in counterpart Chinese application No. 201510178295.6 (with English machine translation; 16 pages).

Japanese Office Action dated Apr. 2, 2019 in counterpart application No. JP 2015-040829 (with English machine translation; 30 pages) (FR2408062 cited in the Japanese Office Action is not listed in this IDS since it was already listed in the IDS filed Jul. 6, 2018).

* cited by examiner

DEVICE AND METHOD FOR THE PIVOTING ASSEMBLY OF AT LEAST TWO COMPONENTS AND CORRESPONDING ASSEMBLY MADE OF TWO ASSEMBLED COMPONENTS

The invention relates to a device for pivotably assembling or attaching at least two components, notably two links of a bracelet, for example a watch bracelet.

Such an assembly device allows links to be assembled, generally using a guide pin (also simply called pin) that guides the pivoting and a screw, it being possible for the assembled links to move rotationally relative to one another.

An assembly of this type is exposed to a risk of unwanted unscrewing. This problem, which is well known to watchmakers, is caused by the repeated movements of the links relative to one another when the bracelet is being worn, or by knocks.

In order to resolve this problem, document CH695389 discloses a device for assembling watch bracelet link elements that allows the link elements, for example two outer link elements and a central link element, to be assembled so that they can move angularly relative to one another. This assembly device comprises a screw equipped with a head, at one of its ends, and with a threaded part at its other end. A middle part of the screw, cylindrical in shape, acts as a guide pin guiding the rotation of the central link element. In order to limit the risk of unwanted unscrewing, a tubular barrel, made of an elastic material and provided with an annular narrowing, is driven into a drilling through which the screw passing through one of the outer link elements passes. The screw comprises an annular groove intended to accommodate the narrowing of the barrel. At the time of assembly, the screw is introduced into the barrel until its narrowing engages in the annular groove of the screw. As a result of that, the barrel applies to the screw a radial clamping force which combines with the retention force applied by the threads of the screw. The screw is thus immobilized axially with respect to the link. Such a solution requires several component parts to be assembled, and this involves a relatively lengthy assembly time. Furthermore, because the clamping force applied by the annular narrowing of the barrel to the screw needs to be high, assembly and/or disassembly operations may prove to be difficult.

The present invention seeks to improve the situation.

To this end, the invention relates to an assembly device for pivotably attaching at least two components, comprising a screw intended to be screwed into a first component and bearing a guide pin guiding the pivoting of a second component, wherein the pin comprises at least one rotation-prevention zone having a shape designed to collaborate with a zone of corresponding shape of the first component, so as to prevent said pin from rotating.

According to the invention, in order to remedy the risk of unwanted unscrewing of the screw and of the components becoming detached, the pin is prevented from rotating, notably prevented from rotating with minimal clearance, by one of the components that are to be assembled. This prevention is performed in a simple way by virtue of collaboration between the shape of the pin and that of the component. This results in axial immobilization of the screw which bears the pin.

In one particular embodiment, the screw is housed in the pin and the pin and the screw are designed to collaborate in such a way that the screw drives the pin in axial translation when it is prevented from rotating and the screw is being screwed into the first component.

The assembly device also has the advantage of taking the form of a preassembled module comprising the screw already housed in the pin, the whole being ready to be incorporated for example into a watch bracelet in a simple way.

The rotation-preventing zone of the pin, for example a peripheral zone, may be a projecting shape, a reentrant shape, or a flat. Accordingly, the first component comprises a zone of complementary shape, being respectively reentrant, projecting, or flatted.

The pin may comprise several peripheral rotation-preventing zones. These various zones may, for example, form a toothset.

In one particular embodiment, the assembly device comprises retention means, notably radial retention means for radial retention between the pin and the screw and designed to allow a relative angular movement between the pin and the screw.

The radial-retention means may notably make it possible to create a torque that applies resistance to the relative rotation of the screw and of the pin, while at the same time allowing a degree of freedom between the pin and the screw.

When the two components are being assembled, all the operator has to do is overcome the resistive torque applied by the radial-retention means in order to make the screw turn with respect to the pin which is prevented from rotating. After assembly, when the assembly device is assembling two components, for example two links of a bracelet, there may still be some clearance between the peripheral rotation-preventing zone of the pin and the correspondingly shaped zone of the first component. In such a case, the pin is mounted in the first component with clearance. As a result, repeated knocks may cause the pin some residual movement. However, such movement has no impact on the screw because the radial-retention means allow the pin to move angularly with respect to the screw. The screw therefore remains in the screwed-in position, without the risk of becoming unscrewed, despite any repeated small rotations there might be of the pin.

Furthermore, by virtue of the radial-retention means, when the assembly device is preassembled, the screw is housed in the pin but does not turn freely inside the latter.

According to a first embodiment, the assembly device comprises at least one seal positioned between the screw and the pin, designed to exert a retention torque between the screw and the pin providing retention between the pin and the screw, notably radial retention between the pin and the screw. In this case, the seal or seals provide the retention, notably the radial retention, between the pin and the screw while at the same time allowing the one to rotate with respect to the other. The seal or seals are designed to shear and thus spare the screw.

The seal may for example be toric or four-lobed. Other types of seal may of course be used.

Advantageously, the pin is secured to the screw in axial translation by collaboration of at least one stop of an internal portion of the pin with at least one stop surface borne by the screw.

The pin may be limited axially by two bearing surfaces borne by the screw, particularly by means of two internal bearing surfaces or lands of the pin. For example, the screw may be made up of two distinct elements: one comprising a head part and a body or intermediate part, which are secured to one another and separated by a land, and the other comprising a threaded end part. When the assembly device is preassembled, these two elements are introduced into the pin then assembled with one another, for example by pressing or laser welding. During assembly, the internal lands of the pin are, for example, interposed between the land separating the head and body parts of the screw and a free end of the end part of the screw.

According to a second embodiment, the pin and the screw bear respective toothsets designed to collaborate by claw coupling, under the effect of elastic return means, so as to exert retention torque providing retention between the pin and the screw, notably radial retention between the pin and the screw.

In this case, the coupling-together of the respective toothsets of the pin and of the screw provides the retention between the pin and the screw, notably the radial retention. Furthermore, in the event of relative rotation of the pin with respect to the screw, caused by residual movement of the pin or at the time of the screwing, the elastic means urge the toothsets together in order to keep them coupled. The radial travel of the pin is less than the angular pitch of the teeth of the screw.

Advantageously, the elastic return means comprise a helical spring housed inside the pin and surrounding the screw, said spring pressing against a bearing surface borne by the screw, at one end, and against a bearing surface borne by the pin, at another end. In this case, and advantageously also, said spring is preloaded by assembling an end part of the screw, bearing a screw thread, and a head part and intermediate part of the screw which are joined to one another.

The respective toothsets of the pin and of the screw may be symmetric or asymmetric. Asymmetric toothsets make it possible to maximize the size of the teeth, making them easier to manufacture, and make it possible to improve the feel perceived by the operation, notably upon the disengagement of the claw coupling, i.e. when the toothsets become disengaged.

The pin and the screw may be interlocked with one another either directly or via an interface ring bearing a first toothset that engages with the toothset of the pin and a second toothset that engages with the toothset of the screw.

Advantageously, the screw is equipped with a head arranged at an open first end of the pin and an end part bearing a screw thread and extending out of the pin at an open second end of said pin.

Advantageously also, the peripheral rotation-preventing zone of the pin is arranged near the first end of the pin.

The invention also relates to an assembly comprising at least two components attached using the assembly device as defined hereinabove.

The invention also relates to a bracelet comprising at least two links attached using the assembly device as defined hereinabove.

The invention finally relates to a method of pivotably assembling at least two components using the assembly device as defined hereinabove, and which comprises, after the assembly device has been introduced into an opening passing through a second component, a screwing step during which the screw is screwed into a first component and drives in axial translation the pivoting-guiding guide pin of the device, which is prevented from rotating through the collaboration of its rotation-preventing zone with the corresponding zone of the first component.

The invention will be better understood with the aid of the following description of various embodiments of the device for pivoting assembly of the invention, with reference to the attached drawings in which.

The invention relates to a pivot assembly or articulation device intended to assemble at least two components that are able to pivot relative to one another. It may be used for assembling links, for example of a bracelet such as a watch bracelet.

Elements that are identical or corresponding, which are depicted in the various figures, bear the same references unless indicated otherwise.

FIGS. 1 to 5 relate to a first embodiment of the assembly device 3 of the invention.

Figure 1:
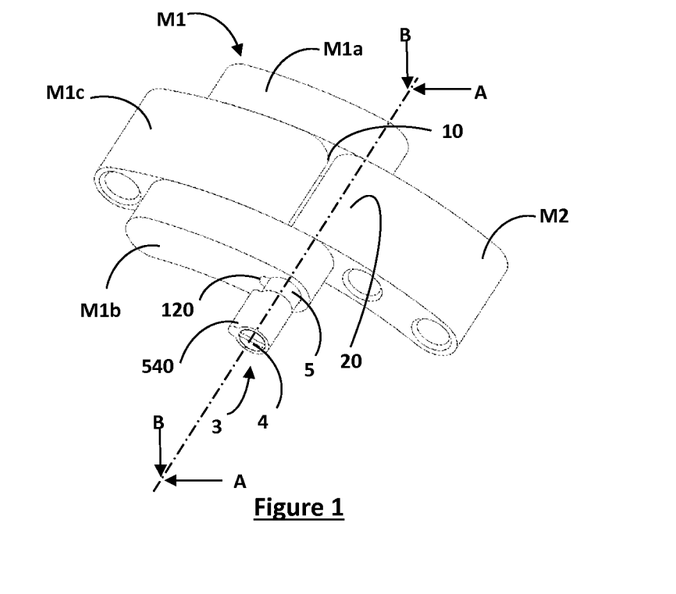
FIG. 1 depicts an assembly of two links of a bracelet comprising an assembly device according to a first embodiment of the invention, during the process of assembly.

FIG. 1 depicts an assembly of two bracelet links M1, M2 using the assembly device 3, during the process of assembly, according to a first embodiment of the invention.

The link M1 is made up of two outer link elements M1a, M1b joined together, in the known way, notably by a central link element M1c. The term "link element" here is intended to denote a simple element or unit of a link. As an alternative, the link M1 could be made as one piece. The two outer link elements M1a, M1b and the central link element M1c delimit a central housing 10 that accepts a lateral end portion 20 of the link M2 only the central link element of which has been depicted in the figures.

Figure 2:
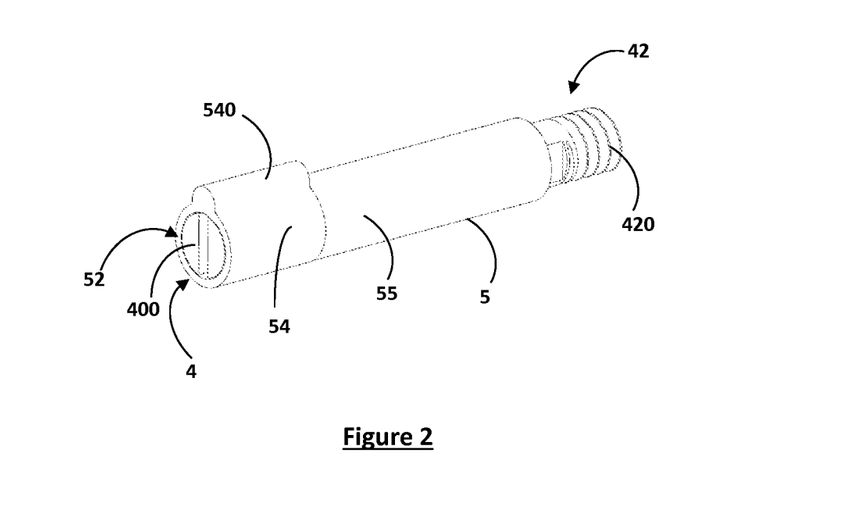
FIG. 2 depicts the assembly device according to the first embodiment.

With reference to FIG. 2, the assembly device 3 comprises a screw 4 and a guide pin 5 for guiding the pivoting. The screw 4 and the pin 5 form two distinct components.

Figure 3:
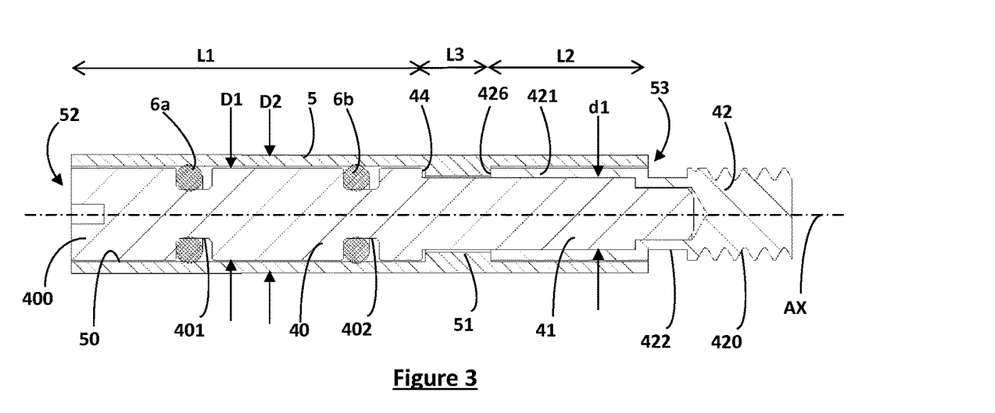
FIG. 3 depicts a view in axial section of the assembly device according to the first embodiment.
Figure 4:
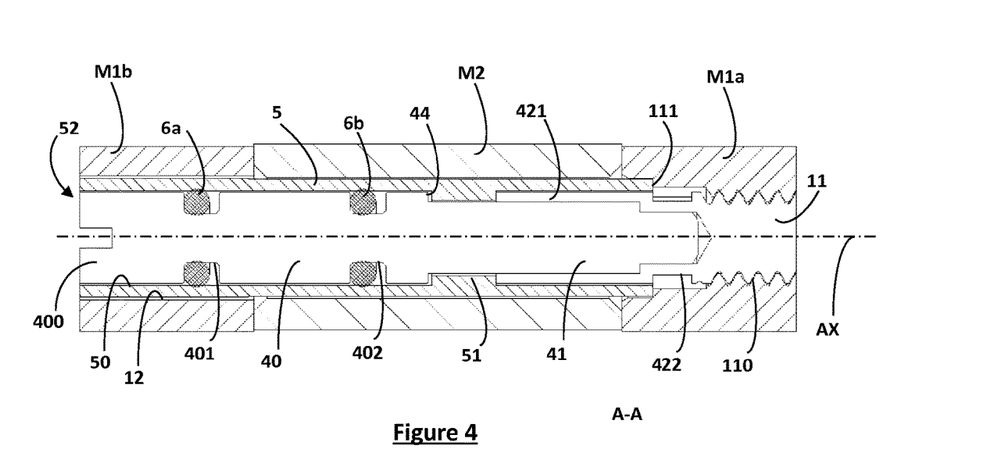
FIG. 4 depicts the assembly of FIG. 1, after assembly, as a view with axial section on A-A.

With reference to FIG. 3, the screw 4 comprises a head part 40, of cylindrical shape and of diameter D1, an intermediate part (or body part) 41, of cylindrical shape and of diameter d1, and a threaded end part 42. The diameter D1 is greater than the diameter d1.

The head part 40 incorporates a screw head 400. The head part 40 and intermediate (or body) part 41 are separated by an annular land 44. They are secured to one another and in this instance form a one-piece component part.

The end part 42 comprises a threaded section 420, at one of its ends, and an assembly section 421 at its other end, these being connected to one another by a junction section 422. The assembly section 421 has a tubular shape with outside and inside diameters respectively equal or substantially equal to D1 and to d1. It is designed to be inserted into the pin 5, via one of its ends 53, at the same time fitting over the free end of the intermediate part 41. The threaded section 420 has an outside diameter here equal or substantially equal to D1. For preference, the diameter of the threaded section 420 is less than the outside diameter of the pin 5 so that the end 53 of the pin 5 forms a bearing surface intended for longitudinally positioning the assembly device relative to the links at the end of assembly.

The guide pin 5 providing pivoting guidance has a tubular cylindrical shape (notably the external surface 55) of axis AX and comprises an open first end 52 and an open second end 53. It forms an internal housing 50 that is cylindrical and coaxial with the axis AX, for accepting the screw 4. The internal diameter of the pin 5 is equal, or substantially equal, to D1. The external diameter of the pin 5 (without the projecting peripheral zone 540 mentioned below) is denoted D2, D2 of course being greater than D1.

The diameters D1, D2 and d1 are depicted in FIG. 3.

The internal wall of the pin 5 is provided with a portion 51 defining at least one stop, notably two stops, here in the form of an annular rib, the height of which is substantially equal to the difference between the diameters D1 and d1 (D1−d1). As an alternative, the internal wall of the pin 5 could bear several stops arranged in a line forming an annulus.

With reference to FIG. 2, the pin 5 comprises, near its first end 52, an end section 54 bearing a projecting peripheral zone 540, or bulge, preventing rotation. In the particular embodiment depicted in FIGS. 1 and 2, the projecting zone 540 has a semicylindrical overall shape of axis parallel to the axis AX. This projecting zone 540 is intended to be inserted into a reentrant zone or cavity, of complementary shape, formed in a link that is to be assembled. The pin 5 comprises an external surface 55 outside the end section 54 forming a pivoting section for a link (here M2) of the bracelet.

FIG. 3 depicts:
an axial length L1 which corresponds to the distance along the axis AX between the open first end 52 and a first stop of the annular portion 51,
an axial length L2, which corresponds to the distance along the axis AX between the open second end 53 and a second stop of the annular portion 51,
an axial length L3 which corresponds to the dimension along the axis AX of the portion 51 (in other words the width of the annular stop).

The axial length of the head part 40 of the screw 4 is equal here to the length L1. The axial length of the intermediate part 41 is slightly greater than L2+L3. The axial length of the assembly portion 421 of the end part 42 of the screw 4 is equal here to the length L2.

The assembly device 3 also comprises two O-ring seals 6a, 6b arranged between the pin 5 and the screw 4 and designed to apply a resistive, notably friction, torque between the pin 5 and the screw 4, creating resistance to the relative rotation of the pin 5 and of the screw 4 and thus providing radial retention between the pin 5 and the screw 4 while at the same time allowing a degree of freedom between the pin and the screw. The resistive torque is determined in such a way as to allow relative rotation of the pin 5 and of the screw 4, notably as the screw is being screwed into the link M1 and in the event of residual travel of the pin 5. The screw 4 forms two annular grooves 401, 402 to house the seals 6a, 6b, in this instance in its head part 40.

In place of O-ring seals, use could be made of any other suitable shape of seal, for example four-lobed seals so as to maximize contact areas. Use could also be made of a single seal or of more than two seals so as to create a sealed zone in which the friction conditions are not influenced by the potential presence of liquid.

The central link M2 has, passing through it, a cylindrical drilling 21 for the passage of the assembly device 3, of a diameter equal or substantially equal to D2, in its lateral end portion 20.

The link element M1a comprises a hole 11 to accept the threaded end 420 of the assembly device 3, the hole being provided with a tapping 110. The hole 11 here passes through the link element M1a. As an alternative, it could be a blind hole. The hole 11 is slightly wider, near its mouth onto the housing 10, so as to form a land 111 acting as a stop for the positioning of the screw 4 at the end of screwing.

The link element M1b has passing through it a drilling 12 for the passage of the assembly device 3, configured to house the end section 54 of the pin 5. The drilling comprises a cylindrical wall provided with a reentrant zone 120, or hollow zone, of a shape that complements that of the projecting zone 540 and which is intended to house the latter.

The assembly device 3 is preassembled by performing the steps described hereinafter:

During a first step, the O-ring seals 6a, 6b are fitted into the annular grooves 401, 402.

During a second step, the one-piece component consisting of the head part 40 and of the intermediate part 41 is introduced into the housing 50 of the pin 5 via the open first end 52 thereof, until its land 44 comes to bear against, or near, the first stop of the annular portion 51 of the pin 5.

During a third step, the assembly section 421 of the end part 42 is introduced into the housing 50 of the pin 5 via the open second end 53 and comes to fit over the free end of the intermediate part 41, until the annular surface 426 of the free end of the assembly section 421 comes to bear against or near the second stop formed by the annular portion 51.

On completion of the second and third steps, the annular portion 51 of the pin 5 is interposed between two stop surfaces consisting of the land 44 and of the annular surface 423 of the free end of the end part 42. However, some clearance or play is left between the portion 51 and the stop surfaces 44 and 426 so as to allow the screw to turn.

The second and third steps may be carried out in any order or simultaneously.

On completion of these steps, the component comprising the head part 40 and intermediate part 41 may be secured to the end part 42 of the screw 4 by pressing. Alternatively, these two elements may be secured to one another by welding, notably by laser welding. The threaded section 420 of the end part 42 extends out of the pin 5 and the screw head 400 is positioned at the open end 52 of the pin 5. The pin 5 is axially delimited with respect to the screw 4 by its internal portion 51 interposed between the land 44 and the free end 426 of the assembly section 421 of the end part 42. The pin 5 and the screw 4 are thus secured together with minimal clearance in axial translation.

Furthermore, the seals 6a and 6b apply a friction torque between the pin 5 and the screw 4 and this creates resistance to the relative rotation of the screw and of the pin and provides the one with radial retention with respect to the other.

Figure 11:
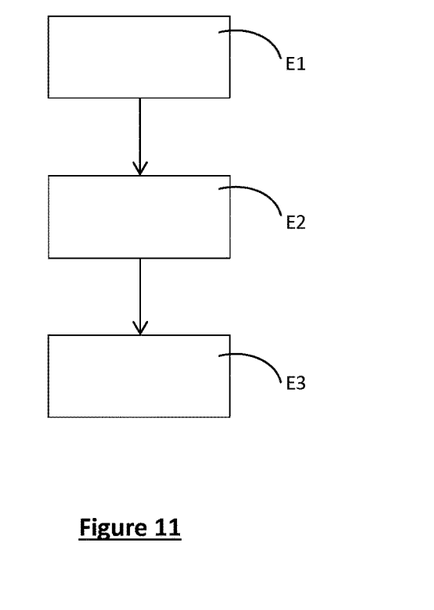
FIG. 11 depicts a flow diagram of the steps of assembling two links using the assembly device of FIG. 3.

The process of assembling the two links M1, M2 using the assembly device 2 already preassembled will now be described with reference to FIG. 11.

During a first step E1, the links M1 and M2 are placed in the assembly position. To do that, the lateral end portion 20 of the link M2 is introduced into the housing 10, between the two link elements M1a and M1b. The openings 11, 21 and 12 are positioned in line with one another so as to form a passage to receive the assembly device 3.

During a second step E2, the assembly device 3 is introduced through the passage formed by the openings 11, 21 and 12 until the projecting zone 540 of the pin slightly enters the housing 120, which allows rotation of the guide pin 5 with respect to the screw 4 to be prevented.

The process then involves a screwing step E3. During this step E3, the screw 4 is turned, for example by an operator, by turning the screw head 400 through the open end 52 of the pin 5. The screwing force applied in order to turn the screw 4 needs to be greater than the friction torque applied by the O-ring seals 6a, 6b. In other words, the operator needs to overcome the friction torque applied by the seals 6a, 6b.

Figure 5:
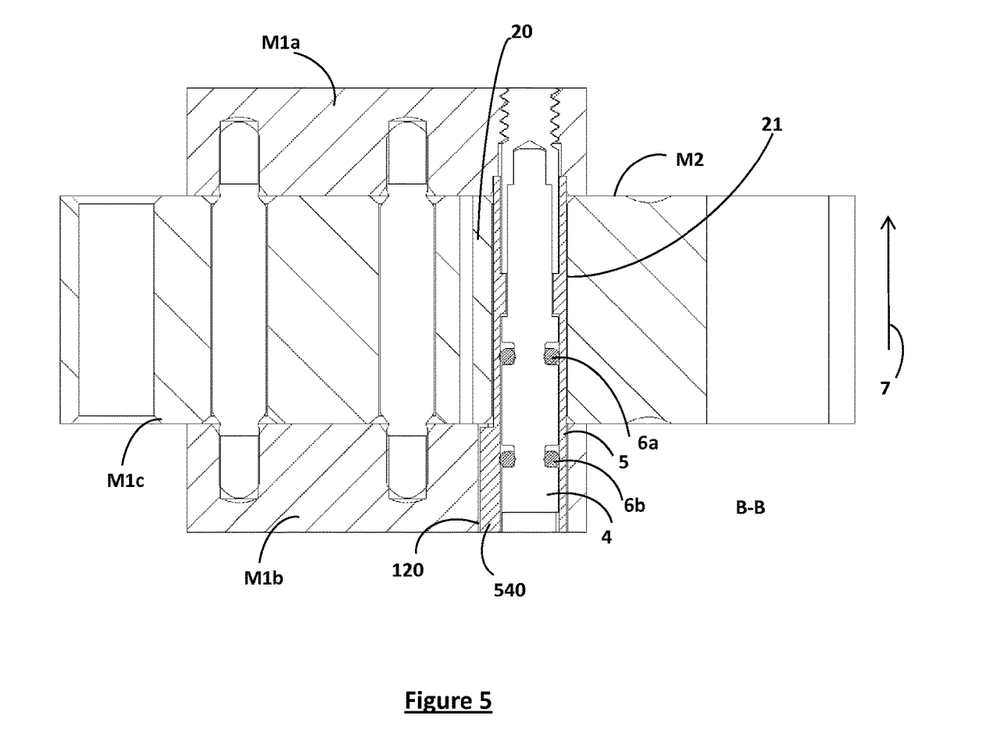
FIG. 5 depicts the assembly of FIG. 1 as a view in axial section on B-B.

Under the action of being turned, the screw 4 moves in a helical movement comprising an axial component directed in the direction of screwing as indicated by an arrow 7 in FIG. 5 as soon as the threaded end 420 engages the tapping 110 of the link element M1a. In its helical movement, the screw 4 drives in axial translation the pin 5 which moves as one with the screw 4 in terms of axial translation but is prevented from rotating through the collaboration of its projecting zone 540 with the reentrant zone 120 of the link M1. Thus, as the screw 4 is screwed into the tapped hole 11 in the link M1, the pin 5 enters the passage formed by the openings 11, 21 and 12 in a movement of axial translation in the direction 7.

The assembly device 3 thus enters the passage formed by the openings 11, 21 and 12 passing through the links M1 and M2 through the helical movement of the screw 4 and axial translational movement of the pin 5 until for example the end 53 of the pin 5 comes into abutment against the land 111 of the link element M1a. The assembly device 3 is thus positioned longitudinally (which means to say in the direction of the axis AX) with respect to the links M1 and M2.

The longitudinal positioning of the assembly device 3 with respect to the links M1 and M2 could be achieved by an alternative or additional stop against which the screw 4 comes into abutment. For example, in the case of a blind tapped hole 11, the additional stop could consist of the closed end of the hole.

On completion of the screwing step E3, the threaded end 420 is fully engaged in the tapping 110 and the entirety of the projecting zone 540 of the pin 5 is housed in the reentrant zone 120 of the link element M1b, as depicted in FIG. 5. Axial retention of the pin 5 with respect to the links M1 and M2 is achieved through the force applied by the threads 420 of the screw 4 within the tapped hole 11 of the link M1. The links M1 and M2 are thus assembled, it being possible for the link M2 to pivot with respect to the link M1 about the pin 5. Said pivot of the link M2 is reached through the rotation of said link around the external surface 55 of the pin 5.

When the bracelet is being worn or in the event of knocks, repetitive contact between the exterior surface 55 of the pin 5 an the internal wall of the hole 21 of the central link M2 occur. That causes small angular movements of the pin 5 with respect to the outer link M1. These angular movements are reduced to a minimum by the projecting zone 540 of the pin 5 which is prevented from rotating by the reentrant zone 120 of the link M1 and butts against the wall thereof. However, there may still be some angular clearance between the respective immobilizing zones 540, 120 of the pin 5 and of the link M1, which is capable of causing residual movement of the pin 5 with respect to the link M1. Such a phenomenon does not, however, have any impact on the screw 4 because of the action of the seals 6a and 6b. What happens is that these are able to shear relative to the contact surfaces of the pin 5 and of the annular grooves 401, 402. The seals 6a, 6b thus allow the pin 5 a small angular movement with respect to the screw 4 making it possible to absorb the residual travel of the pin 5 with respect to the link M1 without the screw 4 being turned. As a result of that the screw 4 is unaffected by the repeated contact between the central link M2 and the pin 5. It remains in its screwed-in position. The risk of unwanted unscrewing is thus eliminated. To complement the effects of the seals 6a, 6b, a clearance may also be created between the body part 41 of the screw and the end part 42. To do that, the end part 42 may be mounted with clearance on the body part 41 of the screw, for example using a key or a bayonet.

In order to dismantle the assembly device 3, in order to disconnect the links M1 and M2, all an operator has to do is turn the screw 4 in the direction of unscrewing, using the screw head 400, by applying an unscrewing torque that is higher than the friction torque applied by the seals 6a, 6b. Under the action of being turned in the unscrewing direction, the screw 4 performs a helical movement that has an axial-translation component in the opposite direction to the direction 7. The screw 4, thus moved, drives the pin 5 in axial translation, which pin is prevented from rotating but moves as one with the screw 4 in terms of axial translation in the opposite direction to the direction 7. The result of this is that the pin 5 leaves the link element M1b with the screw 4 lodged inside it.

Figure 6:
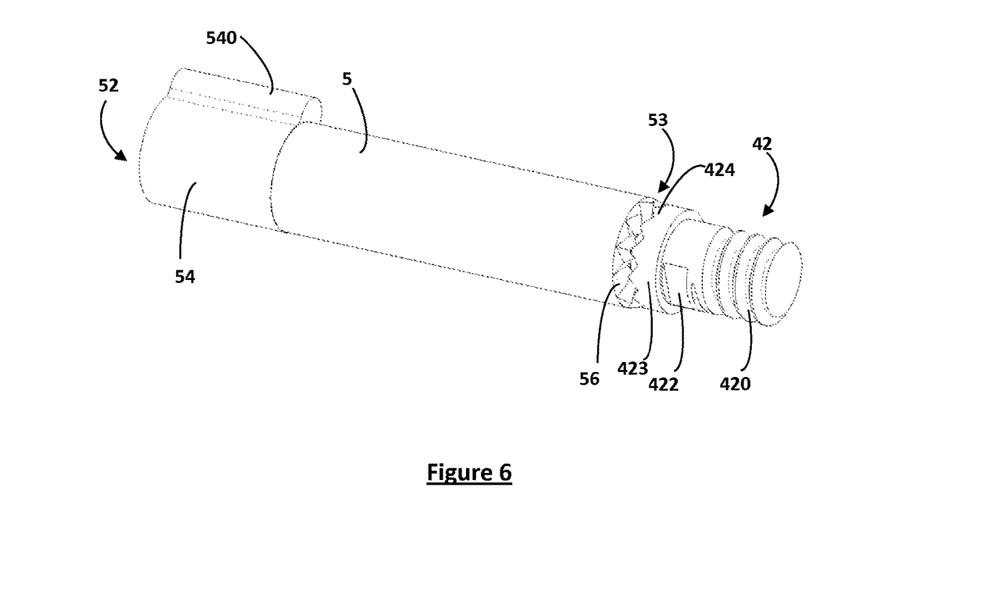
FIG. 6 depicts the assembly device according to a second embodiment.
Figure 7:
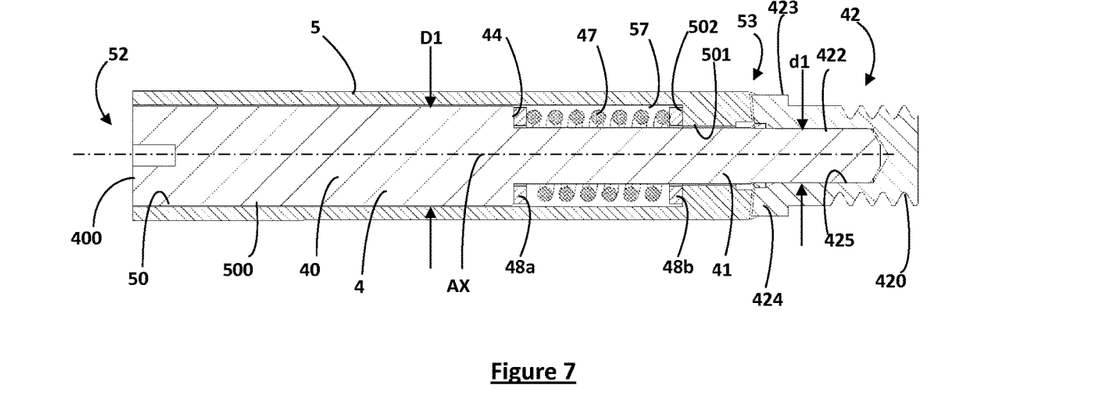
FIG. 7 depicts a view in axial section of the assembly device according to the second embodiment.
Figure 8:
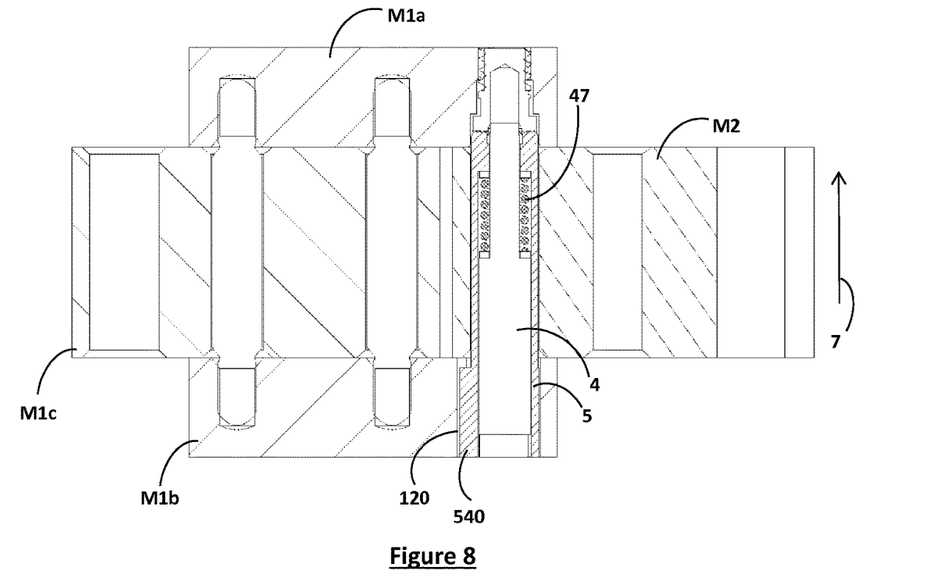
FIG. 8 depicts an assembly of two links comprising the assembly device according to the second embodiment, as a view in axial section on B-B.

FIGS. 6 to 8 depict a second embodiment of the assembly device 3 of the invention. For the sake of clarity, only those elements that differ from the first embodiment described will now be described.

In this second embodiment, the radial retention between the pin 5 and the screw 4 is provided by toothsets 56 and 424 borne by the pin 5 and the screw 4 respectively, in the place of the seals 6a, 6b. Through these toothsets 56, 424, the pin 5 and the screw 4 are designed to collaborate by claw coupling, under the return action of a helical spring 47, so as to apply a claw coupling torque that opposes the relative rotation of the pin 5 and of the screw 4 and provides radial retention between the pin 5 and the screw 4. The angular pitch between the teeth is designed to be greater than the residual angular movement of the pin 5 when the latter is prevented from rotating with clearance in the link M1.

The screw 4 comprises a head part 40, an intermediate part 41 and an end part 42.

The head part 40, of diameter D1, is secured to the intermediate part 41 of diameter d1 (less than D1) and therewith forms a one-piece component part. These two parts 40, 41 are separated by a bearing land 44, against which the helical spring 47 is intended to come to bear at one of its two ends. The axial length of the component 40-41 is greater than the length of the pin 5, the free end of the intermediate part 41 being intended to project out of the pin 5 through the second end 53 thereof when the device 3 is preassembled.

The end part 42 comprises a threaded section 420, at a first end, and an assembly section 423 bearing the toothset 424, at a second end, the two sections 420 and 423 being connected by a junction section 422. An axial opening 425 in the form of a blind hole for accepting the free end of the intermediate part 41 is formed in the end part 42 at the second end thereof.

The pin 5 comprises an internal housing 50 which is cylindrical and coaxial, for accepting the screw 4. The housing 50 comprises a first section 500 of internal diameter equal or substantially equal to D1, comprising the end 52, and a second section 501, comprising the end 53, of a diameter equal or substantially equal to d1. The two sections 500 and 501 are separated by a land 502 against which the helical spring 47 bears. The toothsets 56 are borne by the end 53 of the pin 5. The axial length of the first section 500 of the housing 50 is greater than the axial length of the head part 40 of the screw 4 so as to form a housing 57 to accept the spring 47.

The toothsets 424 and 56 are symmetric here.

The spring 47 bears against the land 44, via a washer 48a, at one of its ends, and against the land 502, by means of another washer 48b, at its other end.

The pin 5 bears a rotation-preventing zone 540, in this instance a projecting one.

The assembly device is preassembled as follows.

During a first step, the washer 48a, the spring 47 and the washer 48b are successively placed over the intermediate part 41.

In a second step, the one-piece component part 40-41 on which the spring 47 and the washers 48a, 48b are placed is introduced into the pin 5, via the end 52, until the screw head 400 becomes lodged inside the pin 5, near the end 52. In this position, the free end of the intermediate part 41 projects out of the pin 5 via the end 53 and the spring 47, bearing against the lands 44 and 502 via the washers 48a, 48b, is preloaded.

During a third step, the end part 42 is assembled with the free end of the intermediate part 41 by inserting and pressing the latter into the opening 425. The end part 42 thus fits over the projecting free end of the intermediate part 41. During assembly, the toothsets 56 and 424 are coupled, or engaged, directly with one another. The pin 5 and the screw 4 thus collaborate by claw coupling, under the return effect of the spring 47, so as to apply a claw-coupling torque that applies resistance to the relative rotation of the pin 5 and of the screw 4.

The process of assembling two links M1 and M2 using the assembly device 3 according to the second embodiment is similar to that described previously except that the screwing torque needs to be higher than the claw-coupling torque applied by the coupled toothsets 56, 424.

As explained previously, when the bracelet is being worn or in the event of knocks, the pin 5 is prevented from rotating by its projecting zone 540 which collaborates with the reentrant zone 120 of the link M1. Furthermore, the screw 4 is unaffected by any potential residual movement of the pin 5 with respect to the link M1 thanks to the interlocked toothsets 56, 424 which allow a relative angular movement between the pin 5 and the screw 4. What happens is that the toothsets 56, 424 are designed to move apart from one another against the return action of the spring 47 under the effect of the dynamics of the pin 5.

Figure 9:
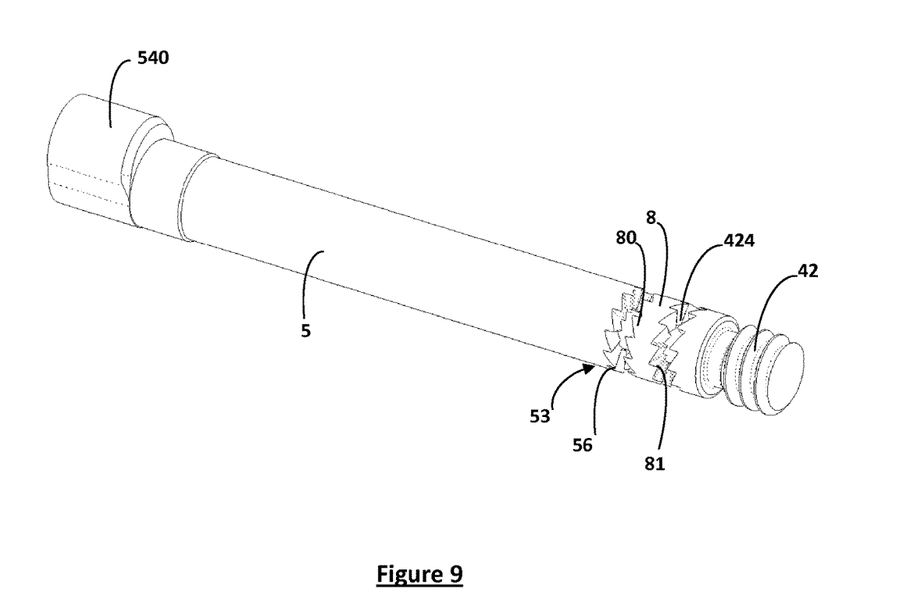
FIG. 9 depicts the assembly device according to a third embodiment.
Figure 10:
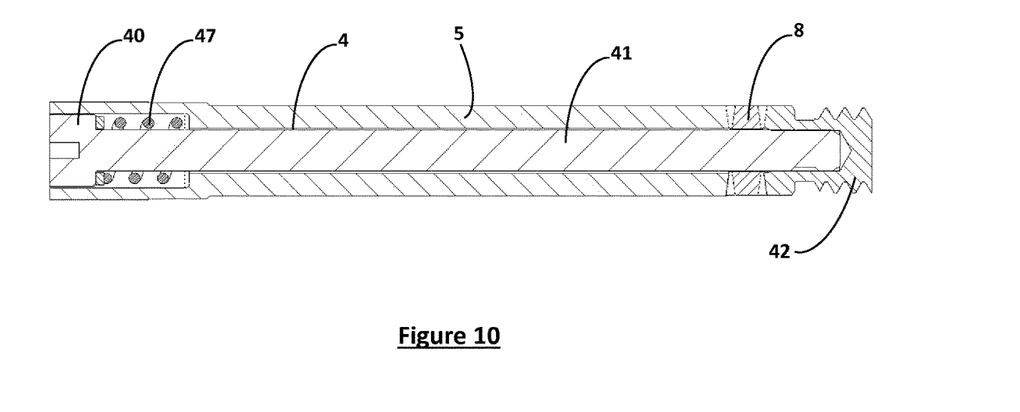
FIG. 10 depicts a view in axial section of the assembly device according to the third embodiment.

FIGS. 9 and 10 depict a third embodiment, representing an alternative form of embodiment of the assembly device which differs from the second embodiment in that the toothset 56 of the pin 5 and the toothset 424 of the end part 42 are coupled to one another not directly but via an additional interface ring 8 which bears a first toothset 80 intended to be coupled to the toothset 56 borne by the end 53 of the pin 5 and a second toothset 81 intended to be coupled to the second toothset 424 borne by the end part 42. The two sets of toothsets (56, 80) and (81, 424) are asymmetric here.

The helical spring 47 is here housed near the screw head 400.

The assembly device 3 according to the third embodiment is preassembled in a way similar to what was previously described relative to the second embodiment. The end part 42 is assembled with the free end of the intermediate part 41 with the interposition of the interface ring 8. The ring 8 is placed over the free end of the intermediate part 41 and the toothsets 56 and 80 are engaged. The free end of the intermediate part 41 is then introduced into the receiving opening 425 of the end part 42 and the toothsets 81 and 424 are engaged. During the preassembly of the device 3, the spring 47 is preloaded. The two sets of toothsets (56, 80) and (81, 424) are interlocked under the action of the spring 47 and oppose the relative rotation of the pin 5 and of the screw 4.

The use of two sets of toothsets that are asymmetric means that manufacture becomes easier and it is possible to produce either teeth which are more coarse than those of the second embodiment, for the same number of indexing positions of the pin 5 relative to the screw 4, or a greater number of teeth and a greater number of indexing positions of the pin 5 relative to the screw 4, which improves the feel perceived by the operator during the disengagement of the claw coupling.

The spring 47 may be housed in any position along the pin 5. In any scenario it bears against the land 44 that separates the head part 40 and the intermediate part 41 of the screw 4, at one of its ends, and against the land that separates the two sections 500 and 501 of the pin 5 respectively comprising a passage of diameter D1 and a passage of diameter d1.

In the foregoing description, the screw 4 and the pin 5 form two distinct components. The screw 4 is fixed into a first link M1. The pin 5 forms a pivoting surface for a second link M2. The screw 4 has no contact with the second link M2.

In the foregoing description, the head part 40 and intermediate or body part 41, and the end part 42 are secured by press fitting. They could be secured together by any suitable means, for example by welding. In the foregoing description, the pin 5 is prevented from rotating with respect to the link M1 by collaboration of a projecting peripheral zone 540 borne by the pin 5 with a reentrant zone 120 provided in the link M1. As an alternative, the peripheral immobilizing zone of the pin 5 could have either the form of a reentrant zone intended to collaborate with a projecting zone of complementary shape of the link M1, or the form of a flat intended to collaborate with a corresponding flat of the link M1.

Moreover, in the foregoing description, the projecting immobilizing zone 540 of the pin 5 has an overall shape that is semicircular in cross section (perpendicular to the axis AX). Of course other shapes are conceivable, for example a U-shape or a V-shape or any other suitable shape.

It is also possible to conceive of several immobilizing zones at the periphery of the pin, for example in the form of a toothset. In that case of course the link 1 would be provided with the same number of immobilizing zones of corresponding shape.

The invention claimed is:

1. A bracelet comprising at least a first link and a second link, and an assembly device pivotably attaching the first and second links, comprising:
    a screw configured to be screwed into the first link, and
    a pin borne by the screw and configured to guide a pivoting of the second link, wherein the pin comprises at least one rotation-prevention zone having a shape configured to collaborate with a zone of corresponding shape of the first link, so as to prevent the pin from rotating.

2. The bracelet as claimed in claim 1, wherein the screw is housed in the pin and wherein the pin and the screw are designed to collaborate so that the screw drives the pin in an axial translation when the pin is prevented from rotating and the screw is being screwed into the first link.

3. The bracelet as claimed in claim 2, wherein the screw is equipped with a head arranged at an open first end of the pin and an end part bearing a screw thread and extending out of the pin at an open second end of said pin.

4. The bracelet as claimed in claim 3, wherein the rotation-prevention zone is a peripheral rotation-prevention zone arranged near the first end of the pin.

5. The bracelet as claimed in claim 1, wherein the rotation-prevention zone is a peripheral rotation-prevention zone and wherein a shape of the rotation-prevention zone is at least one selected from the group consisting of a projecting shape, a reentrant shape and a flat.

6. The bracelet as claimed in claim 1, comprising radial retention means between the pin and the screw for allowing a relative angular movement between the pin and the screw.

7. The bracelet as claimed in claim 1, further comprising at least one seal positioned between the screw and the pin, designed to exert a retention torque between the screw and the pin providing a retention between the pin and the screw.

8. The bracelet as claimed in claim 7, wherein the retention between the pin and the screw is a radial retention.

9. The bracelet as claimed in claim 1, wherein the pin is secured to the screw in terms of an axial translation through a collaboration of at least one stop of an internal portion of the pin with at least one stop surface borne by the screw.

10. The bracelet as claimed in claim 1, wherein the pin and the screw bear respective toothsets designed to collaborate by a claw coupling, under an effect of elastic return means, so as to exert a retention torque providing retention between the pin and the screw.

11. The bracelet as claimed in claim 10, wherein the elastic return means comprise a helical spring housed inside the pin and surrounding the screw, the spring pressing against a bearing surface borne by the screw, at one end, and against a bearing surface borne by the pin, at another end.

12. The bracelet as claimed in claim 11, wherein the spring is preloaded by assembling an end part of the screw, bearing a screw thread, and a head part and intermediate part of the screw which are joined to one another.

13. The bracelet as claimed in claim 10, wherein the retention between the pin and the screw is a radial retention.

14. The bracelet as claimed in claim 1, wherein the screw is fixed into the first link of the bracelet and wherein the pin forms a pivoting surface for the second link of the bracelet.

15. The bracelet as claimed in claim 14, wherein the screwing of the screw induces an axial translation of the pin relative to the first link of the bracelet.

16. A method of pivotably assembling the first and second links of the bracelet as claimed in claim 1, wherein the method comprises:
   introducing the assembly device into an opening passing through the second link,
   screwing during which the screw is screwed into the first link and drives in an axial translation of the pin of the device, which is prevented from rotating through the collaboration of the rotation-prevention zone with the zone of corresponding shape of the first link.

17. An assembly device for pivotably attaching at least two components, comprising:
   a screw configured to be screwed into a first component, and
   a pin borne by the screw and configured to guide a pivoting of a second component, wherein the pin comprises at least one rotation-prevention zone having a shape configured to collaborate with a zone of corresponding shape of the first component, so as to prevent the pin from rotating,
   wherein the pin is secured to the screw in terms of axial translation through a collaboration of at least one stop of an internal portion of the pin with at least one stop surface borne by the screw.

18. An assembly device for pivotably attaching at least two components, comprising:
   a screw configured to be screwed into a first component, and
   a pin borne by the screw and configured to guide a pivoting of a second component, wherein the pin comprises at least one rotation-prevention zone having a shape configured to collaborate with a zone of corresponding shape of the first component, so as to prevent the pin from rotating,
   wherein the screw is equipped with a head arranged at an open first end of the pin and an end part bearing a screw thread and extending out of the pin at an open second end of said pin.

* * * * *